United States Patent
Saito et al.

(10) Patent No.: US 6,271,994 B1
(45) Date of Patent: Aug. 7, 2001

(54) MAGNETIC HEAD HAVING A THIN FILM ELEMENT

(75) Inventors: Hidetoshi Saito; Tomoo Otsuka; Masahiro Iizuka, all of Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/159,326

(22) Filed: Sep. 23, 1998

(30) Foreign Application Priority Data

Oct. 1, 1997 (JP) .................................................. 9-268339

(51) Int. Cl.$^7$ ........................... G11B 21/21; G11B 17/32; G11B 5/60
(52) U.S. Cl. ....................................................... 360/236.5
(58) Field of Search ............................... 360/235.4, 235.7, 360/236.5, 237.1, 246.2, 246.5, 126

(56) References Cited

U.S. PATENT DOCUMENTS 5,901,001 * 5/1999 Meyer et al. ........................ 360/25

FOREIGN PATENT DOCUMENTS

| 4-258805 | * | 9/1992 | (JP) . |
| 6-203328 | * | 7/1994 | (JP) . |
| 7-93720  | * | 4/1995 | (JP) . |

* cited by examiner

Primary Examiner—William Klimowicz
(74) Attorney, Agent, or Firm—Brinks Hofer Gilson & Lione

(57) ABSTRACT

An improved magnetic head comprises a slider and a thin film element, the later of which is provided on a trailing side of the slider. The slider has core layers. The surfaces of the core layers are abraded so that the thickness of an a phase constituting the surface structures of the core layers may be reduced to a very small value. In this way, even if a carbon film is directly formed on the core layers, it is still possible to ensure a desired diffusion between the carbon film and the a phase, thereby effectively preventing the carbon film from separation (peeling) and avoiding the formation of any spot on the carbon film.

9 Claims, 3 Drawing Sheets

MAGNETIC HEAD HAVING A THIN FILM ELEMENT

BACKGROUND OF THE INVENTION

1. Field of the Invention

The present invention relates to a magnetic head having a slider which is adapted to be mounted on a device such as a hard disc device. In particular, this invention relates to a magnetic head capable of reducing a spacing loss by directly forming a carbon film on the surfaces of core layers of a thin film element provided on the above slider. The present invention also relates to a method for manufacturing such an improved magnetic head.

2. Description of the Related Art

FIG. 4 is a cross sectional view indicating a conventional magnetic head adapted to be mounted on a hard disc device, with its surface facing upward (facing a recording medium).

Referring to FIG. 4, the magnetic head 4 involves an upstream side A and a downstream side B (when viewed along the discs moving direction), with the upstream side A referred to as leading side and the downstream side B as trailing side.

In FIG. 4, a reference numeral 1 represents a slider formed by a ceramic material. On its surface facing a recording medium, there is formed a recording medium facing surface 5 (an upwardly floating surface serving as an air bearing surface). As shown in FIG. 4, the recording medium facing surface 5 is formed into a crown-like shape having a predetermined curvature. Further, adjacent to the leading side A of the recording medium facing surface 5, there is formed an inclined surface 6.

Referring again to FIG. 4, in connection with an end portion 2 on the trailing side B of the slider 1, there is provided a protective layer 8 within which is further formed a thin film element 3, so that the thin film element 3 is completely covered by the protective layer 8. The structure of the thin film element 3 will be explained in detail later.

As shown in FIG. 4, on the recording medium facing surface 5 and on surface II (facing the recording medium) of the thin film element 3, there is formed a base layer 9 made of a material such as SiO2 or Si. Further, a carbon film 10 is formed on the base layer 9.

Here, the carbon film 10 serves as a protective layer for the magnetic head. Therefore, by forming the carbon film 10, it is possible to prevent the surface of the thin film element 3 from getting corroded. In addition, the provision of the carbon film 10 is proved to be effective for reducing an abrasion of the surface of the thin film element 3 and the recording medium facing surface 5, even if there is a possible collision between the magnetic head and a recording medium.

FIG. 2 is a perspective view indicating the structure of the thin film element 3 provided at an end portion 2 on the trailing side of the slider 1. However, in FIG. 2 there are not shown the base layer 9, the carbon film 10 and the protective layer 8, though they are shown in FIG. 4.

Referring to FIG. 2, at an end portion 2 on the trailing side of the slider 1, there is formed a lower shield layer 11 consisting of a NiFe alloy (permalloy). Formed on the lower shield layer 11 is a magneto-resistive effect element layer 12, with a lower gap layer (not shown) formed therebetween. Further, formed on the magneto-resistive effect element layer 12 is a lower core layer 13 (serving as an upper shield layer) consisting of NiFe alloy, with an upper shield layer (not shown) formed therebetween.

On the lower core layer 13 is spirally formed a coil layer 14 with a gap layer (not shown) formed therebetween. In addition, an upper core layer 15 is formed on the coil layer 14, with an insulating layer (not shown) formed therebetween. However, the upper core layer 15 is also formed by a magnetic material such as a NiFe alloy, just as the lower core layer 13.

Referring again to FIG. 2, a front end portion of the upper core layer 15 is facing the lower core layer 13, with a magnetic gap G formed therebetween. Further, a base end portion 15a of the upper core layer 15 is in contact with the lower core layer 13.

As is understood from FIG. 2, the thin film element 3 is an MR head (a read-out head), in which a multi-laminated structure arranging from the lower shield layer 11 to the lower core layer 13 (an upper shield layer) employs an magneto-resistive effect element so as to detect a leaked magnetic field leaking from a recording medium such as a hard disc. Further, on the MR head is laminated an inductive magnetic head (a write-in head) formed by another multi-laminated structure arranging from the lower core layer 13 to the upper core layer 15.

Referring to FIG. 4, the slider 1 of the magnetic head is supported by a flexure (not shown) which itself is fixed on a front end of a load beam (not shown). Effected by a resilient force of the load beam which has been formed as a plate spring, the slider 1 is forced to be urged towards a recording medium such as a hard disc. Such a magnetic head is usually used in a hard disc device capable of operating in a contact/start/stop manner, so that when the hard disc is in its stopped state, the recording medium facing surface 5 of the slider 1 will get in contact with the recording surface of the hard disc, effected by the above resilient force. On the other hand, once the hard disc begins to move, an air flow will be directed to flow in the disc's moving direction, passing through a space formed between the slider 1 and the surface of the disc. Thus, the recording medium facing surface 5 will receive an upwardly floating force caused by the air flow, rendering the slider 1 itself to float upwardly a short distance from the surface of the disc.

When in an upwardly floating condition, the slider 1 will be in an inclined position in a manner such that its leading side A is higher than its trailing side B. Further, when in such an upwardly floating condition, information is allowed to be recorded on the disc, by virtue of a leaked magnetic field formed between the lower core layer 13 and the upper core layer 15 of the thin film element 3 (shown in FIG. 2). Alternatively, magnetic signals from the disc may be detected by virtue of the magneto-resistive effect element layer 12 of the thin film element 3.

With the prior art discussed above, a base layer 9 is involved in the magnetic head so that a carbon film 10 (serving as a protective layer) is formed through the base layer 9 on the recording medium facing surface 5 and the surface of the thin film element 3. If the carbon film 10 is directly formed on the thin film element 3 without the base layer 9 formed therebetween, a formed carbon film 10 will separate (peel) from the thin film element 3, or at least it is difficult to obtain a uniformly formed carbon film without any irregular convex and concave points or spots.

The above problem is caused due to a crystal structure forming the surfaces of the core layers of the thin film element 3. As discussed above, both the lower core layer 13 and the upper core layer 15 are formed by a NiFe alloy. However, upon checking the crystal structures of both the layers 13 and 15 by means of X-ray diffraction, it was found that the interior portions of the layers 13 and 15 are mainly γ phase (face centered cubic lattice), while the surface potions of the two layers 13 and 15 are mainly α phase (body centered cubic lattice). In fact, the a phase is a surface layer having a considerable thickness, with its largest thickness being 200 µm.

Since the surface structures of the lower core layer 13 and the upper core layer 15 involve α phase having a considerable thickness, when the carbon film 10 is directly formed on the surfaces of the core layers 13 and 15, there will occur an abnormal diffusion between the α phase and the carbon film 10. For this reason, it is difficult to obtain a carbon film having a uniform thickness, and it is likely that a formed carbon film will separate (peel) from the surfaces of the core layers 13 and 15.

Moreover, if the surface structures of the lower core layer 13 and the upper core layer 15 involve α phase having a considerable thickness, an undesired spacing loss will become large, resulting in a low efficiency of a magnetic field (which is necessary for information recording).

The reason causing the above problem may be concluded to the following fact. Namely, the γ phases of the core layers 13 an 15 will substantially function as a core layer, whilst the α phases forming the surface structures of the core layers 13 and 15 fail to function as a core layer. For this reason, the α phase will cause a spacing loss. As a result, the thicker the α phase, the larger the spacing loss will be.

SUMMARY OF THE INVENTION

In order to solve the above problem associated with the above-discussed prior art, it is an object of the present invention to provide an improved magnetic head capable of reducing a spacing loss by properly adjusting the thickness of an α phase constituting the surface portions of core layers and further allowing a carbon film to be directly formed on the surfaces of the above core layers. Another object of the present invention is to provide a method for manufacturing such an improved magnetic head.

According to one aspect of the present invention, there is provided an improved magnetic head, comprising: a slider; a thin film element provided at an end portion on a trailing side of the slider for magnetic recording and/or reproducing, said thin film element having a NiFe alloy layer. When a recording medium is stopped, a recording medium facing surface of the slider gets in contact with a surface of the recording medium. After the recording medium is started to move, the magnetic head receives an upwardly floating force caused by an air flow on a surface of the recording medium. The magnetic head is characterized in that a carbon film is directly formed on the thin film element's surface facing the recording medium and on the recording medium facing surface of the slider.

In the present invention, a crystal structure of a surface portion of the NiFe alloy layer forming the thin film element, comprises an α phase (body centered cubic lattice) having a thickness of 0.5–40 nm. Preferably, the α phase has a thickness of 1.0–20 nm.

Further, according to the present invention, it is also possible that a crystal structure of a surface portion of the NiFe alloy layer forming the thin film element, is a γ phase (face centered cubic lattice), the carbon film is formed on the thin film element with a diffusion layer (diffusing towards the surface of the γ phase) interposed therebetween.

Moreover, according to the present invention, the carbon film may be replaced by a CN film (carbon nitride film).

According to another aspect of the present invention, there is provided a method for manufacturing an improved magnetic head. The magnetic head comprises: a slider; a thin film element provided at an end portion on a trailing side of the slider for magnetic recording and/or reproducing, said thin film element having a NiFe alloy layer. When a recording medium is stopped, a recording medium facing surface of the slider gets in contact with a surface of the recording medium. After the recording medium is started to move, the magnetic head receives an upwardly floating force caused by an air flow on a surface of the recording medium. The method of the present invention is characterized in that it comprises the steps of:

abrading or etching the surface of the thin film element so that the thickness of an α phase forming a crystal structure on the surface of a NiFe alloy layer may be adjust to be in a range of 0.5–40 nm;

forming a carbon film or a CN film (carbon nitride film) on the thin film element's surface and on an upwardly floating surface of the slider.

Further, according to the present invention, the surface of the thin film element is abraded or etched to such an extent that the thickness of the α phase on the surface of the NiFe alloy layer will be in a range of 1.0–20 nm.

According to a further aspect of the present invention, there is provided a method for manufacturing an improved magnetic head. The magnetic head comprises: a slider; a thin film element provided at an end portion on a trailing side of the slider for magnetic recording and/or reproducing, said thin film element having a NiFe alloy layer. When a recording medium is stopped, a recording medium facing surface of the slider gets in contact with a surface of the recording medium. After the recording medium is started to move, the magnetic head receives an upwardly floating force caused by an air flow on a surface of the recording medium. The method of the present invention is characterized in that it comprises the steps of:

completely removing an α phase so as to expose a γ phase on the surface of the NiFe alloy layer;

causing the carbon ions or nitrogen ions to bombard into the surface of the NiFe alloy layer to form a diffusion layer thereon, so as to form a carbon film or a CN film (carbon nitride) on the thin film element's surface and on an recording medium facing surface of the slider.

With the use of the present invention, it is possible to properly adjust the thickness of an α phase which constitutes the surface structure of the core layers of the thin film element, enabling a carbon film to be directly formed on the surfaces of the core layers. Further, using the present invention it is possible to reduce a spacing loss.

Moreover, in the present invention, the surface of the thin film element is abraded or etched to such an extent that the thickness of the α phase on the surface of the NiFe alloy layer may be in a range of 0.5–40 nm. It has been understood from several experiments that when the thickness of the α phase on the surface of the NiFe alloy layer is in a range of 0.5–40 nm, even if a carbon film is directly formed on the core layers, it is still possible to ensure a desired diffusion between the carbon film and the α phase, thereby effectively preventing the carbon film from separation (peeling) and avoiding the formation of any spot on the carbon film.

On the other hand, according to the present invention, it is also possible that the above α phase may be completely removed. If the α phase is completely removed, a crystal structure constituting the surface portions of the core layers will include only γ phase (body centered cubic lattice). Also, it was found from several experiments that once a carbon film is directly formed on the surface of γ phase, an undesired phenomenon such as separation (peeling) will occur. Accordingly, if the α phase is completely removed, it is necessary that carbon ions or nitrogen ions should be bombarded into the surfaces of the above core layers so as to form a diffusion layer in advance.

By forming a diffusion layer, even if a carbon film or a CN film (carbon nitride film) is directly formed on the core layers, it is still possible to ensure a desired diffusion between the carbon film and the γ phase, thereby effectively preventing the carbon film from separation (peeling) and obtaining an improved tight adhesion between the core layers and the carbon film.

Further, with the use of the present invention, since it is allowed to form a small thickness of α phase which does not have any direct effect on the magnetic recording characteristic, and since it is allowed to dispense with a base layer which was otherwise indispensable in a prior art, it is possible to reduce an undesired spacing loss, thereby ensuring a higher recording density.

DESCRIPTION OF THE PREFERRED EMBODIMENT

Figure 1A:
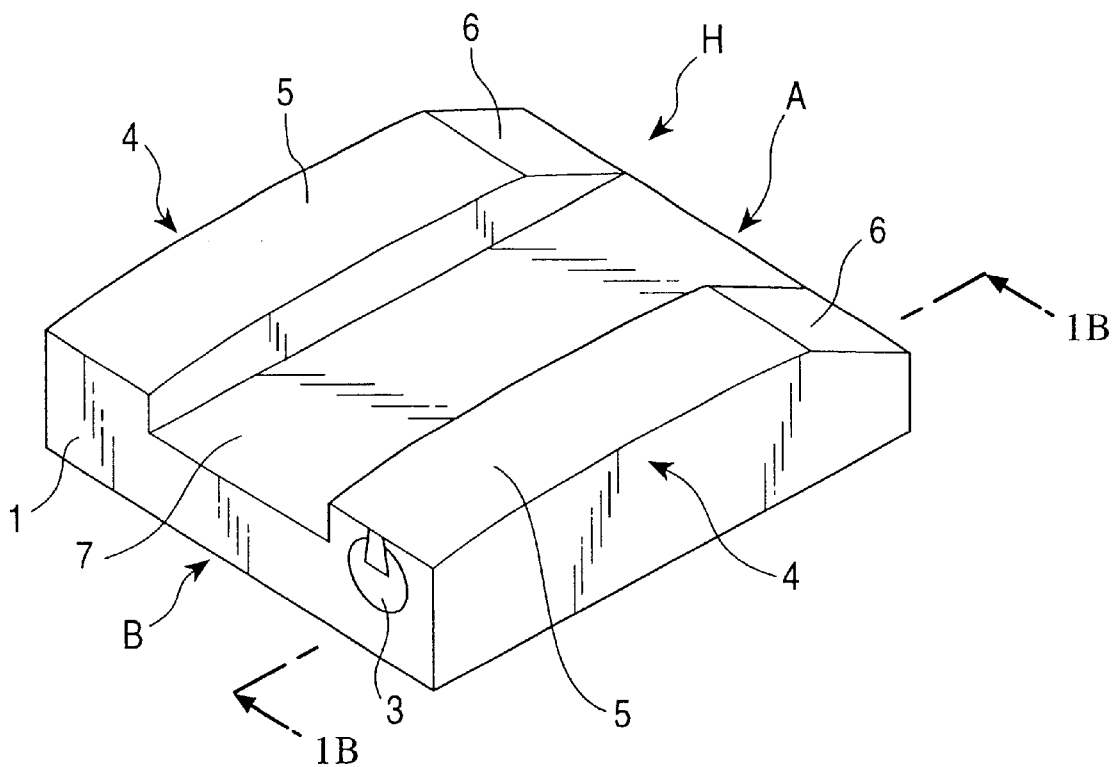
FIG. 1A is a perspective view indicating an improved magnetic head made according to the present invention, with its recording medium facing surface facing upward.
Figure 1B:
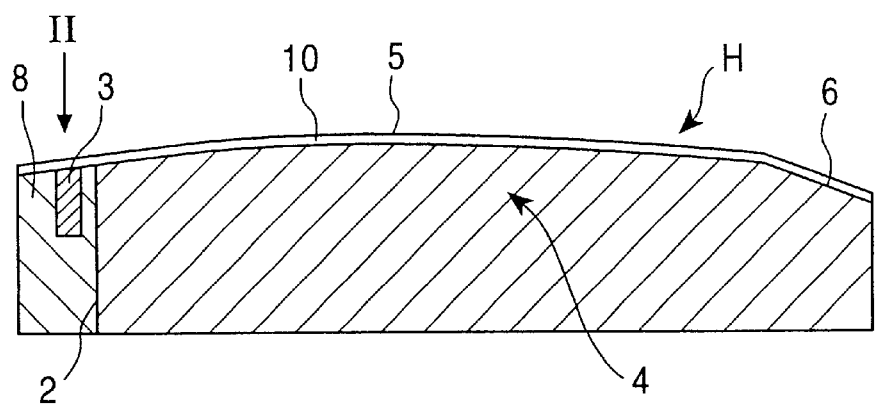
FIG. 1B is a cross sectional view taken along 1B—1B line of FIG. 1A.

FIG. 1A is a perspective view indicating a magnetic head of the present invention adapted to be mounted on a hard disc device, with its recording medium facing surface facing upward. FIG. 1B is a cross sectional view taken along 1B—1B line in FIG. 1A.

A slider 1 of a magnetic head H shown in FIG. 1, is formed by a ceramic material such as alumina carbide, titanium carbide, or Si (silicon). An air groove 7 is formed on one surface of the magnetic head H facing a hard disc which serves as a recording medium here. A pair of rails 4, 4 are formed on both sides of the air groove 7.

Referring to FIG. 1B, each of the pair of rails 4, 4 is formed into a crown-like shape having a predetermined curvature. The surfaces of the rails 4, 4 also form recording medium facing surfaces 5, 5 facing a recording medium such as a hard disc (the recording medium facing surfaces 5, 5 are upwardly floating surface, serving as air bearing surfaces). Further, on a leading side A of the pair of rails 4, 4, there are formed a pair of inclined surfaces 6, 6.

At an end portion 2 on the trailing side B of the slider 1, there is provided a protective layer 8 within which is formed a thin film element 3, so that the thin film element 3 (except its one surface II facing a recording medium) is covered by the protective layer 8 made of a ceramic material such as an alumina $Al_2O_3$, as shown in FIG. 1B.

As shown again in FIG. 1B, on the recording medium facing surfaces 5 and on the surface (facing the recording medium) of the thin film layer 3, there is directly formed a carbon layer 10 by means of sputterring or using a CVD (Chemical Vapour Deposition) method.

By forming the above carbon film 10, it is possible not only to prevent a corrosion of the thin film element 3, but also to protect the above surface of the thin film element 3 and the recording medium facing surfaces 5, 5 from any possible damage, regardless of a possibility that there will be a collision between the slider 1 and a recording medium.

Further, according to the present invention, a CN (carbon nitride) film may be used to replace the above carbon film 10 to obtain a similar effect.

In contrast, with the prior art which has been discussed above, to achieve a tight adhesion between the thin film element 3 and the carbon film 10, it is necessary to form a base layer 9 under the carbon film 10.

In the present invention, although there is no such a base layer 9 formed under the carbon film 10, it is still possible to obtain a tight adhesion between the carbon film 10 and the thin film element 3, thereby allowing a direct formation of a carbon film 10 on the surface of the thin film element 3 and on the recording medium facing surfaces 5, 5. This effect, however, should be considered owning to a surface crystal structure of core layers 13 and 15 which form the thin film element 3.

Figure 2:
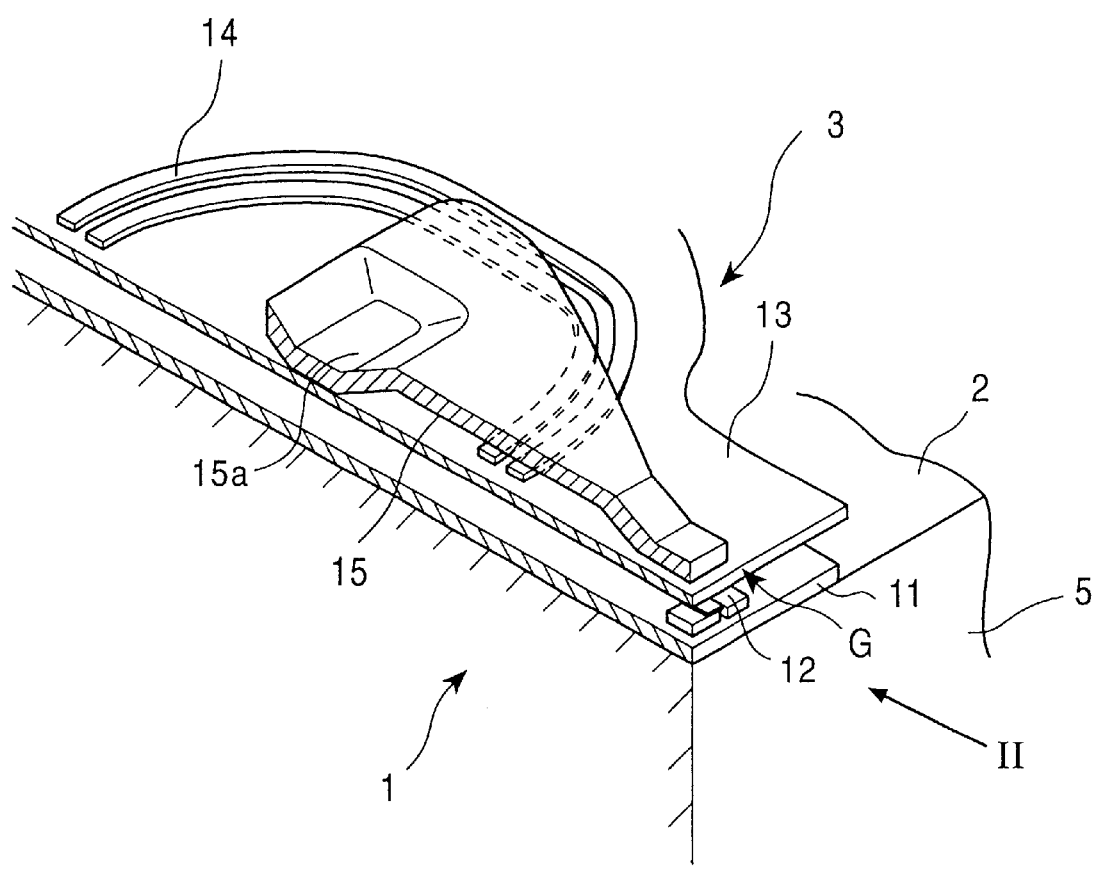
FIG. 2 is an enlarged perspective view taken along an arrow II in FIG. 1B.

FIG. 2 is an enlarged perspective view taken along an arrow II in FIG. 1B. However, the protective layer 8 and the carbon film 10 (shown in FIG. 1B) are not shown in FIG. 2.

Referring to FIG. 2, on the trailing side of the slider 1, there is formed a lower shield layer 11 consisting of a NiFe alloy. Formed on the lower shield layer 11 is a magneto-resistive effect element layer 12, with a lower gap layer (made of an insulating material, but not shown in the drawing) formed therebetween. In detail, the magneto-resistive effect element layer 12 is formed by an AMR element or a thin film element of spin valve type.

Further, formed on the magneto-resistive effect element layer 12 is a lower core layer 13 (serving as an upper shield layer) consisting of NiFe alloy, with an upper gap layer (made of an insulating material, but not shown in the drawing) formed therebetween.

In fact, a multi-laminated structure arranging from the lower shield layer 11 to the upper shield layer 13, forms a magnetism detecting section (a read-out head) for reproducing magnetic information recorded on the disc.

Further, the upper shied layer 13 is also able to function as a lower core layer of an inductive head (a write-in head) which will be described in detail later.

Referring again to FIG. 2, on the lower core layer 13 is spirally formed a coil layer 14 with a gap layer (not shown) formed therebetween. The coil layer 14 is formed by a non-magnetic electrically conductive material having a low electric resistance (such as Cu). In addition, an upper core layer 15 made of NiFe is formed on the coil layer 14. A front end portion of the upper core layer 15 is facing the lower core layer 13, with a magnetic gap G formed therebetween. Further, a base end portion 15a of the upper core layer 15 is in a magnetic contact with the lower core layer 13.

With the inductive head arranging from the lower core layer 13 to the upper core layer 15, if an electric current (for magnetic recording) is flowing through the coil layer 14, a magnetic field (for use in information recording) is induced in the lower core layer 13 and the upper core layer 15, thereby enabling information to be recorded on the hard disc, by virtue of a leaked magnetic field from a magnetic gap G formed between the lower core layer 13 and the upper core layer 15.

According to the present invention, during a process in which the above thin film element 3 is formed at an end portion 2 on the trailing side of the slider 1, it is required to perform a treatment such as mechanical or chemical abrading, a plasma cleaning such as ion etching, so that the surface portion of the thin film element 3 is removed to some extent. In practice, an α phase (body centered cubic lattice) forming the surface crystal structure of the lower core layer 13 and the upper core layer 15 should have a thickness of 0.5–40 nm. However, in the prior art discussed above, the α phase (body centered cubic lattice) forming the surface crystal structure of the lower core layer 13 and the upper core layer 15 has a thickness of several nm to several hundred nm.

Therefore, in the present invention, since the α phase has been made thinner than that in the above prior art, there will be a desired diffusion between the carbon film 10 and the core layers 13, 15 after the carbon layer 10 is directly formed on the surfaces of the core layers 13 and 15. Thus, the carbon film 10 is not easy to separate (peel) from the core layers. In this way, the carbon film 10 may be maintained at a uniform thickness, ensuring a desired smoothness on the surface of the carbon film 10.

Further, if the thickness of the α phase is properly adjusted to a range of 1.0–2.0 nm, it is even possible to obtain a further improved adhesion between the carbon film 10 and the core layers 13, 15.

Moreover, according to the present invention, it is also allowable to completely remove the α phase. However, if the α phase is completely removed, the surface crystal structure of the core layers 13 and 15 will comprise only a phase γ (face centered cubic lattice).

Nevertheless, since a diffusion between the phase γ and the core layers 13, 15 is much slower than a diffusion between the α phase and the core layers 13, 15, if a carbon film 10 is directly formed on the phase γ there would be almost no diffusion between the phase γ and the core layers 13, 15. As a result, it is likely that the carbon film 10 is easy to separate (peel) from the core layers 13, 15.

Accordingly, in the present invention, after the phase α has been completely removed, carbon ions are bombarded into the surfaces of the core layers 13, 15 so as to form diffusion layers thereon. In this way, after the carbon film 10 is formed on the surfaces of the core layers 13, 15, it is possible to prevent the carbon film 10 from separating (peeling) from the core layers 13, 15.

Further, the carbon film 10 may be formed at the same time the carbon ions are bombarding into the surfaces of the core layers 13, 15.

However, when a CN (carbon nitride) film is used to replace the carbon film 10, it is required that carbon ions and the nitrogen ions are bombarded into the surfaces of the core layers 13, 15 so as to form the desired diffusion layers.

In practice, the surface crystal structures of the core layers 13, 15 may be analyzed by way of X-ray diffraction, or using thin film X-ray diffraction.

Figure 4:
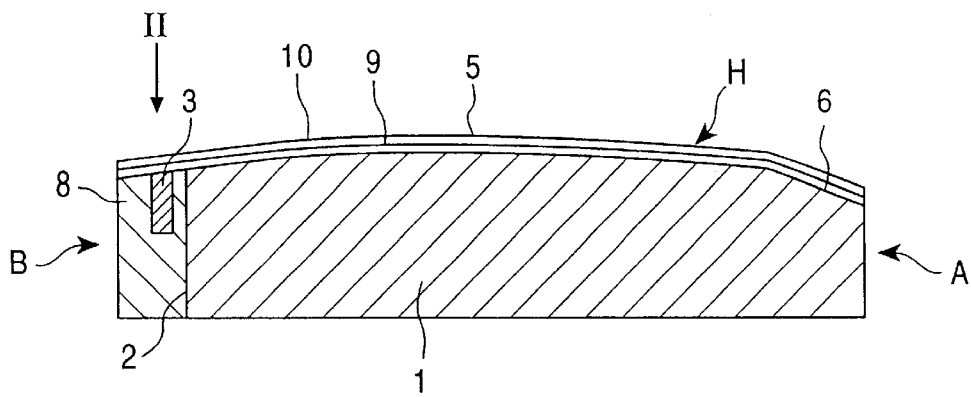
FIG. 4 is a cross sectional view indicating a conventional magnetic head, with its surface (facing a recording medium) facing upward.

In the present invention, since the thickness of the α phase of the core layers 13, 15 is much thinner than that in the prior art, the carbon film 10 may be directly formed on the surfaces of the core layers 13, 15. In this way, it is not necessary to form a base layer 9 (as shown in FIG. 4) which was used in a prior art to form a tight adhesion between the carbon film 10 and the surfaces of the core layers 13, 15, thereby reducing the number of processes for manufacturing the magnetic head.

In particular, since the thickness of the α phase of the core layers 13, 15 is much thinner than that in the prior art and since the base layer 9 is allowed to be omitted, it is possible to reduce a spacing loss as compared with a prior art, thereby ensuring a high reproduction output.

It has been described in the present embodiment that a crystal structure forming the surface portions of the core layers 13, 15 is an α phase and a crystal structure forming the inner portions of the core layers 13, 15 is a γ phase. However, in fact, a crystal affecting a magnetic recording characteristic is the γ phase, while an α phase forming the surface portions of the core layers 13, 15 has almost no effect on the magnetic recording characteristic. Thus, it is understood that the larger the thickness of the α phase. the larger the spacing loss will be, i.e., a larger thickness of the α phase will result in a larger spacing loss in a magnetic head.

In the present invention, since the α phase forming the surface portions of the core layers 13, 15 is thinner than that in a prior art or the α phase may be completely removed, it is allowed to reduce the spacing loss, saving a useful space corresponding to the thickness of the α phase.

The magnetic head H is arranged such that its slider 1 is supported by a flexure (not shown) provided on the front portion of a load beam (not shown). Further, the slider 1 receives a predetermined force in a predetermined direction so that it is urged towards a hard disc which serves as a recording medium here.

The magnetic head H is usually used in a hard disc device (magnetic recording and reproducing device) capable of operation in a CSS (contact/start/stop) method. When the hard disc is stopped, the recording medium facing surfaces 5, 5 of the slider 1 will get in contact with the recording surface of the hard disc. On the other hand, when the hard disc starts to operate, an air flow will be directed to a space between the slider 1 and the hard disc so that the slider 1 as a whole will float upwardly from the disc surface. As a result, the leading side A of the slider 1 becomes higher than its trailing side B, or only its leading side A floats upwardly from the disc surface, resulting in a situation that an end portion of the trailing side B gets in contact with the disc surface continuously or intermittently, forming a slidable movement in an upward direction.

When in such upwardly floating condition, information is allowed to be recorded on the disc, by virtue of a leaked magnetic field generated between the lower core layer 13 and the upper core layer 15 of the thin film element 3 (shown in FIG. 2). Alternatively, magnetic signals from the disc may be detected by virtue of the magneto-resistive effect element layer 12 of the thin film element 3.

EXAMPLE

The thickness of the α phase forming the surface structures of the core layers 13 and 15 was made different for several cases, the MR head (read-out head) was used to reproduce the information previously recorded on the hard disc by means of the inductive head (write-in head). Then, a relationship between the thickness of an α phase and reproduction output was investigated and test results are indicated in FIG. 3.

In this test, the thickness of a carbon film 10 in contact with an α phase is 5.5 nm for all the cases involved in the test, regardless of a fact that phase thickness is different from one α phase to another. In FIG. 3, an expression "0+ion" on the horizontal axis means a condition where an α phase is completely removed and carbon ions are bombarded into a phase γ, finally a carbon film 10 is formed thereon.

Figure 3:
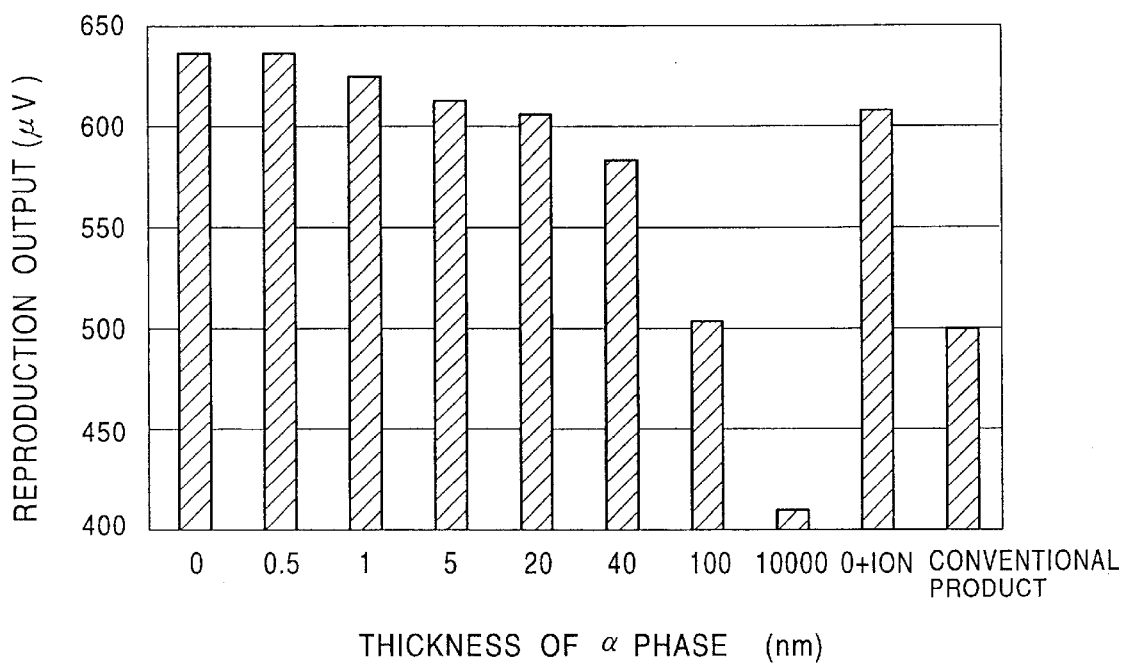
FIG. 3 is a graph indicating a relationship between the thickness of α phase and reproduction output.

As is understood from a graph shown in FIG. 3, a reproduction output will decrease when the thickness of an α phase increases.

It is also understood from the test result that the thickness of an α phase is preferably adjusted to a value of 40 nm or less if it is desired to obtain a high production output. Further, if the thickness of the α phase is adjusted to a value of 20 nm or less, it is possible to obtain a reproduction output of 600 Mm or higher.

Next, the thickness of the α phase and an adhesion of the carbon film 10 were measured, and results are indicated in Table 1.

TABLE 1

| Thickness of phase α | 0 nm | 0.5 nm | 1.0 nm | 5 nm | 20 nm | 40 nm | 0.1 μm | 10 μm | 0 nm + Ion bombardment |
|---|---|---|---|---|---|---|---|---|---|
| Separation | x | Δ | ○ | ○ | ○ | ○ | Δ | x | ○ |
| Spot | ○ | ○ | ○ | ○ | ○ | Δ | x | x | ○ |
| Corrosion Resistance | x | Δ | ○ | ○ | ○ | Δ | x | x | ○ |
| Spacing | ○ | ○ | ○ | ○ | ○ | Δ | x | Δ | ○ |

The "separation" and "spot" indicated in Table 1 represent results obtained by observing outer appearance of each α phase with the use of an electronic microscope. In Table 1, ○ represents a condition where no separation (peeling) and spot were found. Δ represents a condition where some separation (peeling) and spots were found. x represents a condition where a carbon film 10 has been completely separated and spots were found.

As indicated in FIG. 1, if the thickness of an α phase is properly adjusted so as to be within a range of 0.5–40 μm, it is possible to minimize the above undesired separation (peeling) and spot occurrence.

Here, a larger thickness of an α phase will likely cause an easier separation (peeling) and spot occurrence. This is because an abnormal diffusion is likely to occur between the α phase and the carbon film 10. Further, if the thickness of an α phase is 0 μm, a crystal structure forming the surface portions of the core layers 13, 15 is only a γ phase. In such a case, since there is almost no diffusion occurring between the γ phase and the carbon film 10, the carbon film 10 is likely to separate (peel) from its original position.

In Table 1, "corrosion resistance" represents observation results obtained by observing the outer appearance of the thin film element 3 when exposed in a corrosive gas, with the use of an electronic microscope. In detail, ○ represents a condition where no corrosion was found. Δ represents a condition where some corrosion was found. x represents a condition where severe corrosion was found.

It can be seen from Table 1 that when the thickness of the α phase is adjusted to be within a arrange of 0.5–40 nm, there is good corrosion resistance.

In fact, the corrosion resistance of the thin film element 3 has a close relationship with the state of the carbon film 10 which is provided to protect the thin film element 3. If peelings and spots are occurring in the carbon film 10, the thin film element 3 will be directly exposed to an outside environment, causing the thin film element 3 to be more easily corroded. Accordingly, in order to obtain a highly satisfactory corrosion resistance for the thin film element 3, necessary measure should be taken to prevent any peeling and spot from occurring on the carbon film 10.

Further, in Table 1, "spacing" involves three kinds of results represented by ○, Δ, x, incorporating the test results indicated in FIG. 3. To meet a requirement of obtaining a high recording density, it is necessary for the spacing loss to be as small as possible. On the other hand, since the α phase forming the surface portions of the core layers 13 and 15 does not have any direct effect on a magnetic recording characteristic, an increase in the thickness of α phase will cause an increase in the spacing loss, which will bring about a deterioration in a recording magnetic field generated by the inductive head (write-in head). As a result, the MR head (read-out head) can produce only a low reproduction output.

As is understood from the above test results, in the present invention it is required that the thickness of the α phase be in a range of 0.5–40 nm, preferably 1.0–20 nm.

Further, as shown on the right side of Table 1, in a case where an α phase was completely removed and carbon ion bombardment had been completed, it was found that good results were obtained concerning separation (peeling), spot occurrence, corrosion resistance, and spacing loss.

In the present invention, the surface portions of the core layers formed by a NiFe alloy are treated by abrading so as to form a relatively thin α phase (body centered cubic lattice) which constitutes the surface structure of the core layers. Therefore, a carbon film may be directly formed on the surfaces of core layers without a necessity of forming a base layer.

In particular, according to the present invention, since the thickness of an α phase (which dose not have a direct effect on the magnetic recording characteristic) is made thinner than that in a prior art, it is allowed to reduce a spacing loss, having an effect at least corresponding to a thickness of a removed α phase and a thickness of a base layer (which was indispensable in a prior art).

Further, in the present invention, since the thickness of the α phase is adjusted to be in a range of 0.5–40 nm, preferably 1.0–20 nm, spot occurrence or separation (peeling) may be almost completely prevented on the carbon film, thereby ensuring a high reproduction output and a high recording density.

In addition, according to the present invention, the α phase is allowed to be completely removed in a process in which the surfaces of the core layers are treated by abrading. By completely removing the α phase, it is possible to further reduce the spacing loss. Nevertheless, after the α phase is completely removed, it is necessary that carbon ions be bombarded into the surface portions of the core layers to form a diffusion layers thereon, ensuring that the carbon film may be directly formed on the surfaces of these core layers.

What is claimed is:

1. A magnetic head, comprising:
   a slider;
   a thin film element provided at an end portion on a trailing side of the slider for at least one of magnetic recording and magnetic reproducing, said thin film element having a NiFe alloy layer;
   wherein, when a recording medium is stopped, a recording medium facing surface of the slider contacts a surface of the recording medium;

wherein, after the recording medium is started to move, the magnetic head receives an upwardly floating force caused by an air flow on the surface of the recording medium; and wherein a carbon film is directly formed on a surface of the thin film element facing the recording medium and on the recording medium facing surface of the slider; and wherein a crystal structure of a surface portion of the NiFe alloy layer forming the thin film element, comprises an α phase (body centered cubic lattice) having a thickness of 0.5–40 nm.

2. The magnetic head according to claim 1, wherein the α phase has a thickness of 1.0–20 nm.

3. A magnetic head, comprising:

a slider;

a thin film element provided at an end portion on a trailing side of the slider for at least one of magnetic recording and magnetic reproducing, said thin film element having a NiFe alloy layer;

wherein, when a recording medium is stopped, a recording medium facing surface of the slider contacts a surface of the recording medium;

wherein, after the recording medium is started to move, the magnetic head receives an upwardly floating force caused by an air flow on the surface of the recording medium; and wherein a carbon film is directly formed on a surface of the thin film element facing the recording medium and on the recording medium facing surface of the slider; and wherein a crystal structure of a surface portion of the NiFe alloy layer forming the thin film element, is a γ phase (face centered cubic lattice), the carbon film is formed on the thin film element with a diffusion layer (diffusing towards the surface of the γ phase) interposed therebetween.

4. The magnetic head according to any one of the claim 1–3, wherein the carbon film is replaced by a CN film (carbon nitride film).

5. A magnetic head, comprising:

a slider;

a thin film element provided at an end portion of the slider, the thin film element having a NiFe alloy layer, wherein a crystal structure of a surface portion of the NiFe alloy layer comprises an α phase (body centered cubic lattice) having a thickness in the range of about 0.5 nm through about 40 nm; and a film formed on a surface of the thin film element facing a recording medium, the film comprising carbon.

6. The magnetic head according to claim 5, wherein the film comprises CN (carbon nitride).

7. The magnetic head according to claim 5, wherein the α phase has a thickness in the range of about 1.0 nm through about 20 nm.

8. A magnetic head, comprising:

a slider;

a thin film element provided at an end portion of the slider, the thin film element having a NiFe alloy layer, wherein a crystal structure of a surface portion of the NiFe alloy layer comprises a γ phase (face centered cubic lattice);

a film formed on a surface of the thin film element facing a recording medium, the film comprising carbon; and a diffusion layer interposed between the film and the surface of the thin film element, the diffusion layer diffusing towards the surface of the γ phase.

9. The magnetic head according to claim 8, wherein the film comprises CN (carbon nitride).

* * * * *

UNITED STATES PATENT AND TRADEMARK OFFICE
CERTIFICATE OF CORRECTION

PATENT NO. : 6,271,994 B1
DATED : August 7, 2001
INVENTOR(S) : Hidetoshi Saito et al.

It is certified that error appears in the above-identified patent and that said Letters Patent is hereby corrected as shown below:

Title page,
Item [73], after "Tokyo" insert -- ; Hidetoshi Saito, Niigata-ken, both of --.

Signed and Sealed this

Thirtieth Day of April, 2002

Attest:

*Attesting Officer*

JAMES E. ROGAN
*Director of the United States Patent and Trademark Office*